(12) United States Patent
Killian

(10) Patent No.: US 6,244,414 B1
(45) Date of Patent: *Jun. 12, 2001

(54) CLUTCH DRIVEN DISC FRICTION MATERIAL MOUNTING

(75) Inventor: Michael L. Killian, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/392,945

(22) Filed: Sep. 9, 1999

(51) Int. Cl.[7] .............................. F16D 13/64; F16D 69/04
(52) U.S. Cl. ................ 192/212; 192/107 R; 192/107 M; 219/91.2
(58) Field of Search ................. 192/107 R, 107 M, 192/212; 188/250 G, 218 L; 219/91.2

(56) References Cited

U.S. PATENT DOCUMENTS

| | | | |
|---|---|---|---|
| 1,085,769 | * 2/1914 | Thomson | 219/91.2 |
| 3,037,860 | 6/1962 | Masterson et al. | |
| 3,698,526 | * 10/1972 | Berges | 192/107 M |
| 3,710,071 | * 1/1973 | Volker et al. | 219/93 |
| 3,913,716 | * 10/1975 | Sedlock | 192/107 R |
| 3,946,192 | 3/1976 | Allen et al. | |
| 3,982,612 | * 9/1976 | Krupka | 188/250 G X |
| 4,565,274 | 1/1986 | Cameron | |
| 4,860,872 | 8/1989 | Flotow | |
| 5,158,165 | 10/1992 | Flotow | |
| 5,322,151 | 6/1994 | Denton et al. | |

* cited by examiner

Primary Examiner—Richard M. Lorence
(74) Attorney, Agent, or Firm—Dykema Gossett PLLC

(57) ABSTRACT

A clutch driven disc assembly includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the annular disc. Friction material button has a metallic friction material cookie with at least three apertures. A backer plate is fixed to the friction material. At least three spot welds are within three corresponding apertures in the cookie. At least one of the welds are offset from a line joining two others of the welds. The welds join the substantially annular disc and the backer plate, in turn fixing the friction material button to the substantially annular disc.

14 Claims, 4 Drawing Sheets

CLUTCH DRIVEN DISC FRICTION MATERIAL MOUNTING

FIELD OF THE INVENTION

This invention relates in general to friction clutches and in particular to the structure of clutch driven discs.

BACKGROUND OF THE INVENTION

Clutches are well known devices used to selectively connect a source of rotational power, such as the crankshaft of an internal combustion engine and its flywheel, to a driven mechanism, such as a transmission. Typically, clutches have a driven disc rotatably fixed to the transmission input shaft and axially disposed between a flywheel and a pressure plate. Both the flywheel and the pressure plate are rotatably fixed to the output shaft of the engine. The pressure plate is axially biased toward the flywheel by an axial spring load. When the clutch is in an engaged condition, the pressure plate clamps the driven disc against the flywheel. Friction material is disposed on both sides of the driven disc to resist slipping between the driven disc and both the pressure plate and the flywheel. When the clutch is in a released condition, the axial spring load is overcome by a release mechanism, unclamping the driven disc. With the driven disc unclamped, relative rotation between the transmission input shaft and the engine output shaft becomes possible. When the clutch is reengaged, the pressure plate is pressed against the friction material, halting relative rotation between the engine output shaft and the transmission input shaft.

When the clutch is reengaged, and to a lesser degree when the clutch is released, the friction material wears due to the contact at relative speed with the pressure plate and flywheel.

Commonly, the friction material on the driven disc is provided in the form of a plurality of discrete elements or cookies. The cookies are adhesively bonded or brazed to metal plates to form friction material buttons. The buttons are in turn fixed to radially extending paddles of the driven disc assembly by rivets which pass through laterally extending flanges of the backing plates overlying the paddles. The thickness of the rivet heads limits the amount of the friction material available for wear which can be usefully employed to provide engagement between the engine and the transmission. To compensate for the rivet head thickness, the friction material is made thicker than would otherwise be necessary. Also, the backer plate and the disc paddles are both larger than the cookies to enable the buttons to be riveted to the paddles at their outer edges.

Disadvantages of riveting the buttons to the paddles include: the need to provide the necessary extra thickness of friction material for clearing the rivet heads and the associated increased rotational inertia contributed by the friction material; the extra rotational inertia attributable to the extra backer plate material and extra disc material used at the rivet locations; and a susceptibility to warpage of the cookie, characterized by the center or edges of the friction material lifting off of the backer plate with usage of the clutch and wear of the friction material.

It is desired to provide a driven disc with a reduced height attachment for friction material buttons which alternatively enables the use of thinner friction material cookies or extended wear of the friction material. It is also desired to provide a driven disc assembly having lower inertia. It is also desired to provide a driven disc having the buttons mounted thereto in such a manner that the tendency of the cookies to distort relative to the driven disc is reduced.

It is also desired to provide a method of making a driven disc having a reduced height attachment for friction material buttons which enables the use of thinner friction material cookies, or, alternatively, enables the extended wear of the friction material. It is also desired to provide a method of making a driven disc having lower inertia. It is also desired to provide a driven disc having buttons mounted thereto in such a manner that any tendency of the cookies to distort relative to the driven disc is reduced.

SUMMARY OF THE INVENTION

A clutch driven disc assembly includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the annular disc. Friction material button has a metallic friction material cookie with at least three apertures. A backer plate is fixed to the friction material. At least three spot welds are within three corresponding apertures in the cookie. At least one of the welds are offset from a line joining two others of the welds. The welds join the substantially annular disc and the backer plate, in turn fixing the friction material button to the substantially annular disc.

A method for fabricating a clutch driven disc including the steps of forming a hub, and rotatably fixing an annular spring plate to the hub concentric thereto. A friction disc assembly is mounted concentric with the hub for rotation relative to the spring plate. A plurality of drive springs are installed between the spring plate and the disc assembly. The friction disc assembly is formed by forming both a reinforcing plate having spring pocket configured to receive the drive springs, by forming a substantially annular disc extending radially beyond the reinforcing plate, and fixing the substantially annular disc to the reinforcing plate. A cookie is formed out of metallic friction material so as to have at least three apertures therethrough. The apertures in the cookie are oriented so that at least one of the apertures is offset from a line joining two others of the apertures. A backer plate of is formed of steel. The friction cookie is brazed to the backer plate to form a friction material button. The friction material button is welded to the annular disc by forming spot welds aligned with the apertures in the cookies.

A method of fixing a friction material cookie to a driven disc paddle including the steps of forming a disc having a radially extending paddle and forming a friction material cookie of sintered metal having at least three apertures therethrough. The apertures are oriented in the cookie so that at least one of the apertures is offset from a line joining two others of the apertures. A backer plate is formed of steel. The friction cookie is brazed to the backer plate to form a friction material button. The friction material button is spot welded to the annular disc by forming spot welds aligned with the apertures in the cookies.

The invention provides a clutch driven disc with a reduced height attachment for friction material buttons which alternatively enables the use of thinner friction material cookies or extended wear of the friction material. The invention also provides a driven disc assembly having lower inertia than a clutch driven disc employing rivets to join friction material buttons to the driven disc. The invention also provides a driven disc having the buttons mounted thereto in such a manner that the tendency of the cookies to distort relative to the driven disc is reduced.

The invention additionally provides a method of making a driven disc having a reduced height attachment for friction material buttons enabling the use of thinner friction material cookies, or, alternatively, enabling the extended wear of the friction material. The invention provides a method of making a driven disc having lower inertia. The invention also provides a driven disc having buttons mounted thereto in such a manner that any tendency of the cookies to distort relative to the driven disc is reduced relative to distortion which would be anticipated for cookies fixed to a clutch driven disc by rivets passing through latterly extending flanges of the backer plates.

DESCRIPTION OF PREFERRED EMBODIMENTS

Figure 1:
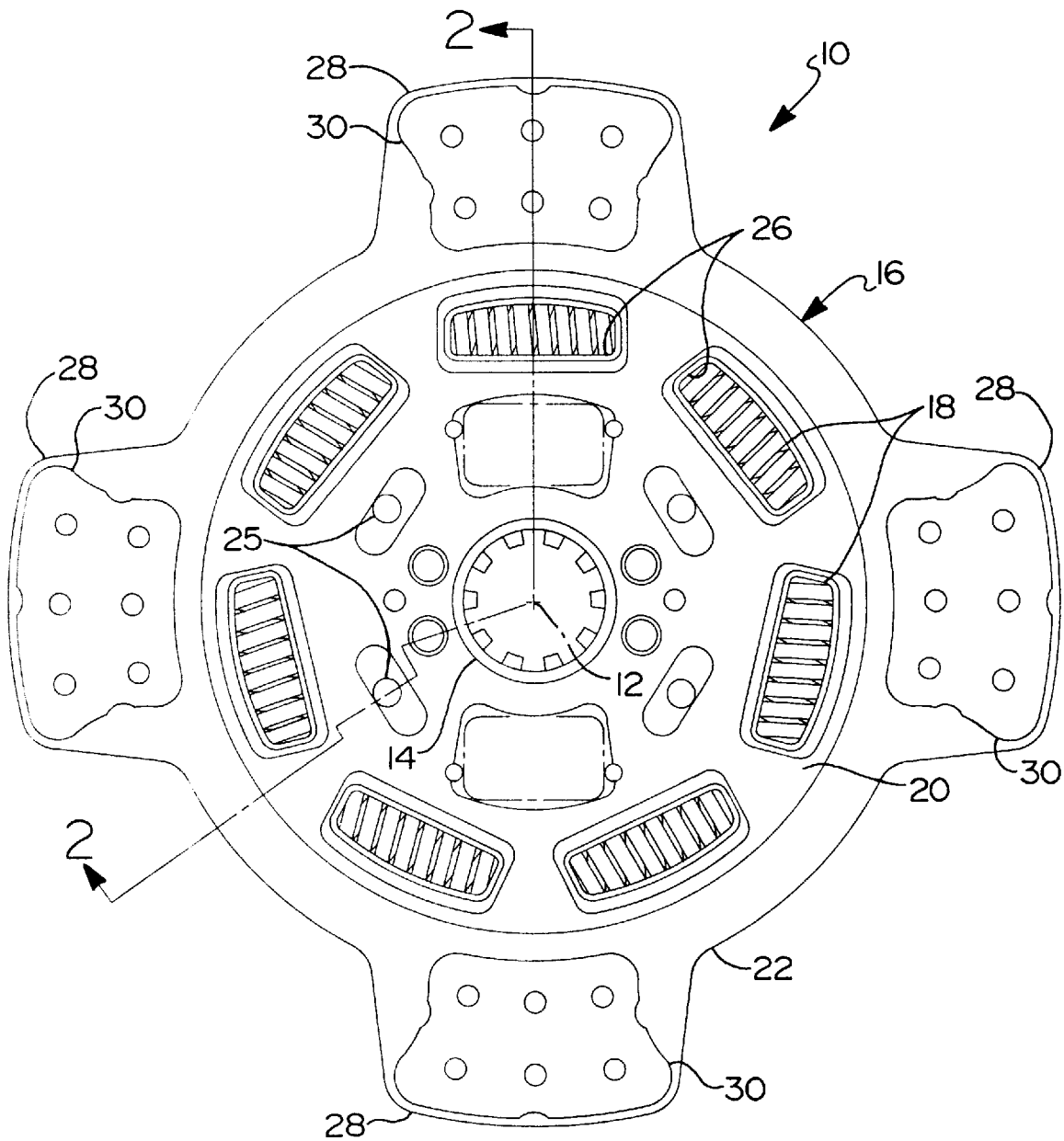
FIG. 1 is an end view of a clutch driven disc.
Figure 2:
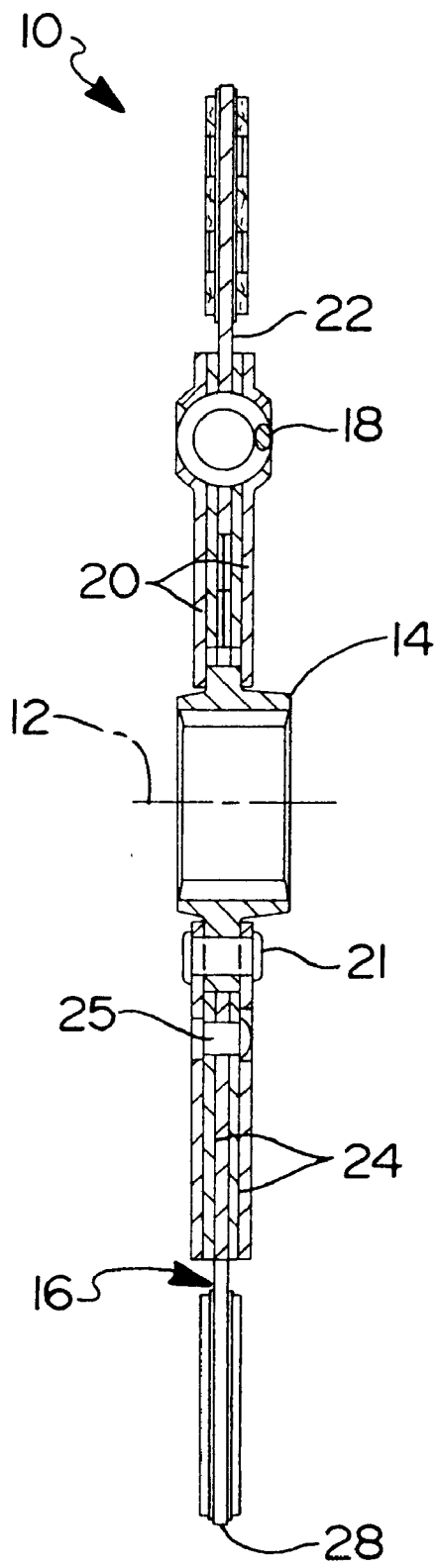
FIG. 2 is a sectional side view of the clutch driven disc of FIG. 1 in the direction of arrows 2.

A clutch driven disc assembly 10 as shown in FIG. 1 and FIG. 2 includes an axis of rotation 12, a hub 14, a friction disc assembly 16 and a plurality of damping or drive springs 18 disposed between hub 14 and friction disc assembly 16.

A pair of spring plates 20 are fixed to hub 14 by rivets 21.

Friction disc assembly 16, best shown in FIG. 2, includes a substantially annular disc 22 fixed to a pair of annular reinforcing plates 24 by rivets 25 or other fastening means. Disc 22 is typically a plain carbon steel such as SAE 1080. Reinforcing plates 24 are axially disposed between spring plates 20. Drive springs 18 are disposed simultaneously in spring pockets 26 in reinforcing plates 24 and spring pockets in spring plates 20. Relative rotation of disc assembly 16 to hub 14 compresses drive springs 18.

Figure 3:
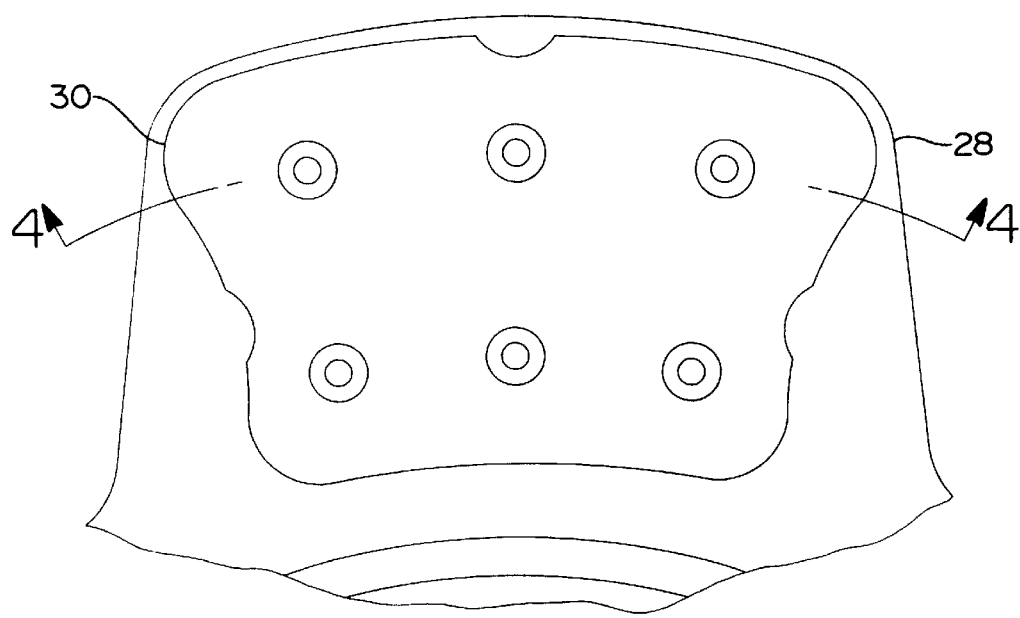
FIG. 3 is an enlarged view of a portion of the clutch driven disc of FIG. 1 in the circle 3.
Figure 4:
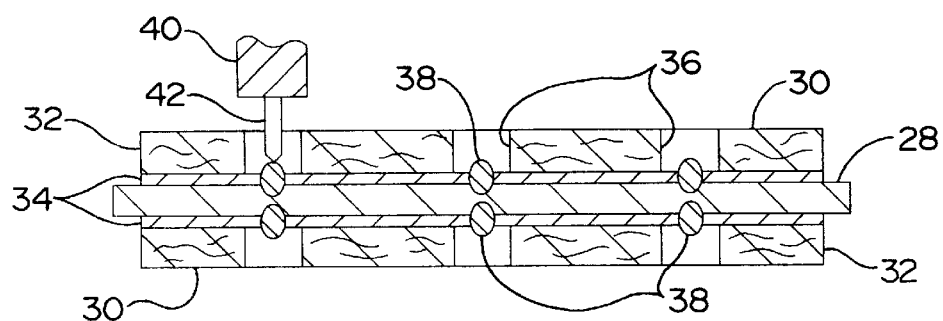
FIG. 4 is a sectional view of the portion of the clutch driven disc of FIG. 3 in the direction of arrows 4.

Disc 22 has a plurality of radially extending paddles 28, best shown in FIG. 3. While four paddles 28 are shown, an alternative number of paddles 28 such as three may be employed. Friction elements or buttons 30 made of friction material are disposed on both sides of each paddle 28. Friction buttons 30 are used to provide frictional engagement with a clutch flywheel (not shown) and a clutch pressure plate (not shown) when installed in a vehicle.

Clutch friction buttons 30 include a friction material cookie 32 made of an appropriate sintered metallic composite. Such friction materials are well known in the art. Cookie 32 is fixed to a steel backer plate 34, preferably by brazing. However, unlike the extended backer plate used for the riveted design, backer plate 34, as configured for attachment to paddle 28 in accord with the present invention, is substantially the same size and shape as friction material cookie 32. The resultant smaller size of backer plate 34 is enabled by the elimination of the need for laterally extending rivet flanges. Backer plate 34 is formed of steel. Backer plate 34 is in turn welded to paddle 28. Cookies 32 have a plurality of apertures 36 therethrough. Apertures 36 are sized to accommodate a welding torch or welding electrode 40 to enable the welding of backer plate 34 to paddle 28. In a preferred embodiment, backer plate 34 is unperforated, having no holes, or at least no holes in alignment with apertures 36. A plurality of welds 38, each aligned with one of apertures 36, connects backer plate 34 to paddle 28. While a preferred embodiment employs six apertures 36 to accommodate six welds 38, alternative embodiments may employ more or fewer welds 38. The number and placement of welds 38 is determined by the optimal number and location of welds 38 needed to prevent distortion of cookies 32 relative to backer plates 34 and paddles 28. At least three welds 38 should be employed to attach each cookie. At least one weld 38 should be offset from a straight line passing between two other welds 38 on the same paddle to provide the desired anti-warping effect.

A method for fabricating clutch assembly 10 is now described. Hub 14 is formed by conventional means, including stamping, forging, casting or other appropriate metal forming processes. Annular spring plates 20 are formed by an appropriate metal forming process such as stamping and are rotatably fixed to hub 14. Reinforcing plates 24 are stamped of steel and have spring pockets 26 formed therein configured to receive springs 18. Annular disc 22 is stamped of steel. Friction disc assembly 16 is assembled by riveting reinforcing plates 24 to annular disc 22. Friction disc assembly 16 is located concentric with spring plates 20 and hub 14 for rotation relative to spring plates 20 and hub 14. A plurality of drive springs 18 are installed between spring plates 20 and friction disc assembly 16.

A method for arc welding friction buttons 30 to disc 22 is now described. Inside arc plug or spot welding is used to attach a clutch button 30 to paddle 28. First though, a sintered friction material cookie 32 is brazed to steel backer plate 34. Consistent with the preferred practice for inside arc plug welding, cookie 32 has a plurality of apertures 36 passing therethrough. As noted above, backer plate 34, in a preferred first embodiment, is unperforated at the locations of apertures 36 prior to mounting to paddle 28. Apertures 36 in cookie 32 provide access for an electric arc from an electric welding torch 40 and for filler metal 42 to reach steel backer plate 34.

While the arc from torch 40 and filler metal 42 have sufficient force to penetrate through the sintered friction material of cookie 32 without the provision of apertures 36, this is not the preferred approach of welding. It is also preferred to keep braze material out of the holes. However, some braze material contamination resulting from a small amount of braze overflow into apertures 36 when friction material cookie 32 is brazed to backer plate 34 will not seriously degrade weld quality of plug weld 38.

The most desirable configuration of arc plug weld 38 is to have the top or outermost portion of weld 38 recessed well below the top or outermost surface of the friction material to minimize the thickness of the friction material needed. This is particularly true when weld 38 is principally formed of a wear resistant material such as steel. Weld 38 is configured so that its height relative to paddle 28 is less than a height of a rivet head formerly used to fix button to paddle 28, thereby enabling the use of thinner friction material.

Because disc 22 is a plain, high carbon steel, preheating the weld area of disc 22 immediately prior to welding is recommended. While induction heating is a preferred choice for preheating paddles 28, paddles 28 can also be preheated with resistance heaters, with oxygen-fuel gas flames, with quartz lamps, with furnaces or with other heat sources.

For arc plug welding clutch buttons 30 to steel discs 22 on a large volume production basis, a preferred choice of welding processes is automatic or robotic Gas Metal Arc Welding (GMAW). Filler metal 42 used with GMAW comes in the form of wire and is automatically delivered to the weld location. Filler metal wire 42 may be either solid or tubular cored. However, the best results are achieved with a solid wire.

Deposition of filler metal 42 into aperture 36 requires less than two seconds of time. The welding time from arc initiation and wire run-in, to crater fill is regulated by a precision weld controller. Although the gas nozzle-to-work distance typically is set so that torch 40 is approximately ⅛ to ¼ inch above cookie 32, torch 40 can be built with an insulated tip or nozzle that will allow torch 40 to be placed directly against friction cookie 32 without creating a short circuit. This direct contact approach is especially advantageous for semiautomatic plug welding where the positioning of torch 40 is otherwise not precisely controlled.

If the arc plug welding system has multiple torches 40, all welds 38 of button 30 can be applied simultaneously. The potential problem of mutually induced arc blow, that is, the deflection of the arc by magnetic fields from adjacent arcs, can be overcome by pulsing the current and keeping the pulses out of phase for with respect to adjacent arcs. Multiple ground locations can also be used to minimize arc blow.

Figure 5:
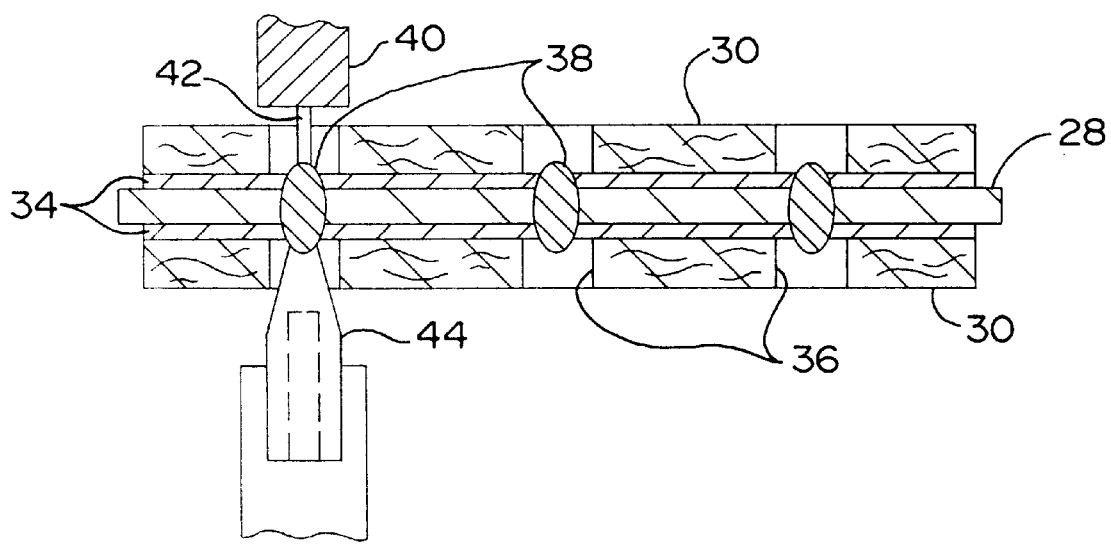
FIG. 5 is a sectional view of a first alternative embodiment of the clutch driven disc of FIG. 3 in the direction of arrows 4.

With arc plug welding, it is also possible to weld two buttons 30 on opposing sides of disc 22 simultaneously. However, this is more difficult than single-sided attachment. To attach two opposing buttons 30 simultaneously, both cookies 32 need to have their apertures 36 located in a mirror image pattern to ensure their alignment. Liquid-cooled, tapered, copper alloy fixture pins 44 with flat or radiused faces, are inserted into apertures 36 of the opposing side button 30 as shown in FIG. 5. Fixture pins 44 may serve a secondary function as electrical grounds. Weld 38 penetrates through a first backer plate 34, through steel paddle 28, which is typically ⅛ inch thick, and fuses with a second backer plate 34. Contact of the fixture pins with backer plate 34 opposite torch 40 prevents weld 38 from penetrating through the backer plate 34 which is so contacted. Penetration of backer plate by weld 38 would result in a spill of weld metal and a loss of the weld puddle.

A way to balance the amount of weld 38 on each side of disc 22 is to insert fixture pin 44 only part way into the aperture 36. Although the partial insertion permits penetration of weld 38 through backer plate 34 opposite torch 40, fixture pin 44 limits the flow of weld 38 into aperture 36 so that aperture 36 on that side is only partially filled.

An alternate method for balancing the amount of weld 38 on each side of disc 22 is to alternate torches 40 and pins 44 on either side of disc 22. While providing holes in disc 22, holes in the torch-side backer plate 34 or holes in the opposite side backer plate 34 may facilitate full penetration welding, such holes are not absolutely necessary.

Figure 6:
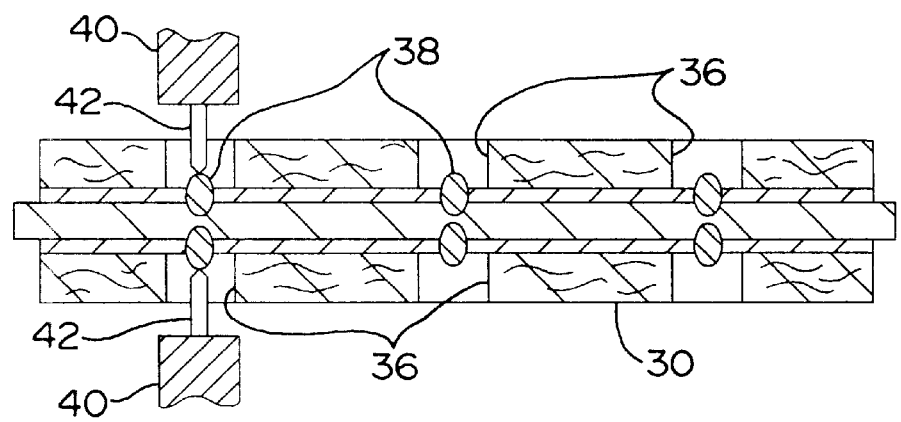
FIG. 6 is a sectional view of a second alternative embodiment of the clutch driven disc of FIG. 3 in the direction of arrows 4.

Alternative arc welding processes to the GMAW process with solid or tubular wire described above are Submerged Arc Welding (SAW), Plasma Arc Welding (PAW) and Gas Tungsten Arc Welding (GTAW) as shown in FIG. 6. Both PAW and GTAW use filler metal in the form of solid wire, or can be operated without the addition of filler metal. Such welding (without filler metal) is known as autogenous welding. In one mode of operation, two torches could be placed over opposing buttons 30, with the torches 40 aligned and facing each other. Opposing plug welds 38 are formed simultaneously. Simultaneously welding of both buttons 30 can be performed with disc 22 in either a horizontal or vertical plane. However, the preferred orientation of disc 22 is the vertical plane.

Plasma Transferred Arc Welding (PTAW), which uses powder as filler material, provides yet another alternative means of welding button 30 to disc 22. An advantage of PTAW is that weld penetration, or dilution of the filler metal, can be controlled very accurately, making the process a good choice for plug or spot welding. With the proper selection of filler metal 42 and good control of dilution, elimination of the backer plates 34 is possible. That is, friction material cookie 32 could be plug welded directly to the disc 42. It should be appreciated that the filler metal 42 chosen would preferably be a bronze alloy such as aluminum bronze if the backer plate is eliminated. Another benefit of PTAW is that the powder filler material can be formulated to have the desired high coefficient of friction.

Among filler materials 42 that can be used for arc plug welding attachment of clutch buttons 30 to steel discs 22 are the bronze materials, especially silicon bronze, aluminum bronze nickel or stainless steel alloys and low carbon steels. If bronze filler material is employed, then the wear rate of weld 38 will be approximately equal to that of friction cookie 32. If the wear rate of weld 38 approximates that of cookie 32, then the need to minimize the height of weld 38 is eliminated. Penetration of backer plate 34 would not be possible with bronze filler material unless apertures through backer plates 34 and paddles 28 are provided. Bronze filler material will fuse with the friction material to join buttons 30 to paddle 28.

The embodiments disclosed herein have been discussed with the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

What is claimed is:

1. A clutch driven disc assembly comprising:
   a hub having an axis of rotation;
   an annular spring plate rotatably fixed to the hub;
   a friction disc assembly mounted concentric with the axis of rotation for rotation relative to the spring plate;
   a plurality of drive springs operably disposed between the spring plate and the friction disc assembly;
   the friction disc assembly including:
      a reinforcing plate having spring pockets receiving the drive springs;
      a substantially annular disc fixed to the reinforcing plate; and
      a friction material button fixed to the substantially annular disc and comprising:
         a metallic friction material cookie having a plurality of apertures,
         a backer plate fixed to the friction material, and
         at least three spot welds within three corresponding apertures in the cookie with at least one of the welds being offset from a line joining two others of the welds and the welds joining the substantially annular disc and the backer plate which fixes the friction material button to the substantially annular disc.

2. A clutch driven disc assembly as claimed in claim 1 wherein the spot welds are plug welds.

3. A clutch driven disc assembly as claimed in claim 1 wherein the backer plate is the same size and shape as the friction material cookie.

4. A clutch driven disc assembly as claimed in claim 1 wherein the substantially annular disc has a plurality of radially extending paddle areas, and both the friction material and the backer plate are substantially the same size and shape as the paddle areas.

5. A clutch driven disc assembly as claimed in 2 wherein the backer plate covers the apertures in the metallic friction material cookie and the weld plug comprises at least in part steel and the weld plug is recessed within the aperture substantially below an outermost surface of the metallic friction material cookie.

6. A clutch driven disc assembly as claimed in claim 4 wherein the backer plate defines a plurality of apertures in alignment with the apertures in the metallic friction material cookie.

7. A clutch driven disc assembly as claimed in claim 6 wherein the paddle defines a plurality of apertures in alignment with the apertures in the metallic friction material cookie and the apertures in the backer plate.

8. A clutch driven disc assembly as claimed in claim 7 wherein the weld plug comprises at least in part a bronze alloy and the weld plug is recessed within the aperture substantially below an outermost surface of the metallic friction material cookie.

9. A method for fabricating a clutch driven disc including the steps of:

forming a hub;

rotatably fixing an annular spring plate to the hub concentric thereto;

mounting a friction disc assembly concentric with the hub for rotation relative to the spring plate;

installing a plurality of drive springs between the spring plate and the disc assembly;

forming the friction disc assembly by:

forming a reinforcing plate having spring pockets configured to receive the drive springs;

forming a substantially annular disc extending radially beyond the reinforcing plate;

fixing the substantially annular disc to the reinforcing plate; and forming a cookie out of metallic friction material having at least three apertures therethrough;

orienting the apertures in the cookie so that at least one of the apertures is offset from a line joining two others of the apertures;

forming a backer plate of steel;

brazing the friction cookie to the backer plate to form a friction material button;

spot welding the friction material button to the substantially annular disc by forming spot welds aligned with the apertures in the cookies.

10. A method of forming a clutch driven disc as claimed in claim 9 wherein the spot welds are plug welds.

11. A method of forming a clutch driven disc as claimed in claim 9 wherein the backer plate is the same size and shape as the friction material cookie.

12. A method of forming a clutch driven disc as claimed in claim 9 wherein the substantially annular disc is provided with a plurality of radially extending paddle areas, and both the friction material and the backer plate are substantially the same size and shape as the paddle areas.

13. A method of forming a clutch driven disc as claimed in claim 12 wherein the paddle areas are preheated to a predetermined temperature before spot welding the button to the paddle.

14. A method of fixing a friction material cookie to a driven disc paddle including the steps of:

forming a disc having a radially extending paddle;

forming a friction material cookie of sintered metal having at least three apertures therethrough;

orienting the apertures in the cookie so that at least one of the apertures is offset from a line joining two others of the apertures;

forming a backer plate of steel;

brazing the friction cookie to the backer plate to form a friction material button;

spot welding the friction material button to the annular disc by forming spot welds aligned with the apertures in the cookies.

\* \* \* \* \*